United States Patent
Rathod et al.

(10) Patent No.: US 9,286,385 B2
(45) Date of Patent: Mar. 15, 2016

(54) METHOD AND SYSTEM FOR PROVIDING ACCESS TO INFORMATION OF POTENTIAL INTEREST TO A USER

(75) Inventors: Priyang Rathod, Mountain View, CA (US); Phuong Nguyen, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 461 days.

(21) Appl. No.: 13/484,134

(22) Filed: May 30, 2012

(65) Prior Publication Data

US 2012/0310628 A1 Dec. 6, 2012

Related U.S. Application Data

(63) Continuation-in-part of application No. 11/789,609, filed on Apr. 25, 2007, now Pat. No. 8,209,724.

(51) Int. Cl.
*G06F 17/27* (2006.01)
*G06F 17/30* (2006.01)

(52) U.S. Cl.
CPC ...... *G06F 17/30796* (2013.01); *G06F 17/3082* (2013.01)

(58) Field of Classification Search
CPC .......................... G06F 17/30796; G10L 15/26
USPC ............................................................ 704/9
See application file for complete search history.

(56) References Cited

U.S. PATENT DOCUMENTS

| | | |
|---|---|---|
| 5,192,999 A | 3/1993 | Graczyk et al. |
| 5,481,296 A | 1/1996 | Cragun et al. |
| 5,703,655 A | 12/1997 | Corey et al. |
| 5,790,935 A | 8/1998 | Payton |
| 5,809,471 A | 9/1998 | Brodsky |
| 5,859,662 A | 1/1999 | Cragun et al. |
| 5,974,406 A | 10/1999 | Bisdikian et al. |
| 5,983,214 A | 11/1999 | Lang et al. |
| 5,983,237 A | 11/1999 | Jain et al. |
| 5,995,959 A | 11/1999 | Friedman et al. |
| 6,151,603 A | 11/2000 | Wolfe |
| 6,253,169 B1 * | 6/2001 | Apte et al. ........................ 704/9 |

(Continued)

FOREIGN PATENT DOCUMENTS

| | | |
|---|---|---|
| CN | 1393107 | 1/2003 |
| CN | 1585947 | 2/2005 |

(Continued)

OTHER PUBLICATIONS

Chinese Office Action dated Jun. 26, 2012 from Chinese Application No. 200710196237.1 from China Patent Office, pp. 1-11, People's Republic of China (English language translation included, pp. 1-6).

(Continued)

*Primary Examiner* — Jakieda Jackson
(74) *Attorney, Agent, or Firm* — Sherman IP LLP; Kenneth L. Sherman; Hemavathy Perumal

(57) ABSTRACT

The present invention provides a method and system for providing access to information of potential interest to a user. Closed-caption information is analyzed to find related information on the Internet. User interactions with a TV which receives programming including closed-caption information are monitored to determine user interests or topics.

8 Claims, 6 Drawing Sheets

(56) References Cited

U.S. PATENT DOCUMENTS

| | | | |
|---|---|---|---|
| 6,253,238 B1 | 6/2001 | Lauder et al. | |
| 6,266,094 B1 | 7/2001 | Taylor | |
| 6,314,398 B1 | 11/2001 | Junqua et al. | |
| 6,317,710 B1 | 11/2001 | Huang et al. | |
| 6,334,127 B1 | 12/2001 | Bieganski et al. | |
| 6,396,544 B1 | 5/2002 | Schindler et al. | |
| 6,412,073 B1 | 6/2002 | Rangan | |
| 6,438,579 B1 | 8/2002 | Hosken | |
| 6,480,835 B1* | 11/2002 | Light | 707/707 |
| 6,480,844 B1 | 11/2002 | Cortes et al. | |
| 6,631,346 B1* | 10/2003 | Karaorman et al. | 704/9 |
| 6,637,028 B1 | 10/2003 | Voyticky et al. | |
| 6,714,909 B1 | 3/2004 | Gibbon et al. | |
| 6,721,748 B1 | 4/2004 | Knight et al. | |
| 6,766,523 B2 | 7/2004 | Herley | |
| 6,771,302 B1* | 8/2004 | Nimri et al. | 348/14.08 |
| 6,774,926 B1 | 8/2004 | Ellis et al. | |
| 6,801,895 B1 | 10/2004 | Huang et al. | |
| 6,807,675 B1 | 10/2004 | Maillard | |
| 6,826,512 B2 | 11/2004 | Dara-Abrams et al. | |
| 6,842,877 B2 | 1/2005 | Robarts et al. | |
| 6,954,755 B2 | 10/2005 | Reisman | |
| 6,961,954 B1 | 11/2005 | Maybury et al. | |
| 6,981,040 B1 | 12/2005 | Konig et al. | |
| 7,028,024 B1 | 4/2006 | Kommers et al. | |
| 7,054,875 B2 | 5/2006 | Keith, Jr. | |
| 7,062,561 B1 | 6/2006 | Reisman | |
| 7,069,575 B1 | 6/2006 | Goode et al. | |
| 7,110,998 B1 | 9/2006 | Bhandari et al. | |
| 7,130,790 B1* | 10/2006 | Flanagan et al. | 704/2 |
| 7,158,961 B1 | 1/2007 | Charikar | |
| 7,158,986 B1 | 1/2007 | Oilver et al. | |
| 7,162,473 B2 | 1/2007 | Dumais et al. | |
| 7,165,080 B2 | 1/2007 | Kotcheff et al. | |
| 7,181,438 B1 | 2/2007 | Szabo | |
| 7,184,959 B2 | 2/2007 | Gibbon et al. | |
| 7,194,460 B2 | 3/2007 | Komamura | |
| 7,203,940 B2 | 4/2007 | Barmettler et al. | |
| 7,225,187 B2 | 5/2007 | Dumais et al. | |
| 7,284,202 B1 | 10/2007 | Zenith | |
| 7,305,384 B2 | 12/2007 | Omoigui | |
| 7,343,365 B2 | 3/2008 | Farnham et al. | |
| 7,363,294 B2 | 4/2008 | Billsus et al. | |
| 7,370,050 B2* | 5/2008 | Hunter et al. | |
| 7,386,542 B2 | 6/2008 | Maybury et al. | |
| 7,389,224 B1 | 6/2008 | Elworthy | |
| 7,389,307 B2 | 6/2008 | Golding | |
| 7,433,935 B1 | 10/2008 | Obert | |
| 7,493,646 B2 | 2/2009 | Ellis | |
| 7,552,114 B2 | 6/2009 | Zhang et al. | |
| 7,565,345 B2 | 7/2009 | Bailey et al. | |
| 7,571,455 B2* | 8/2009 | Lee | 725/109 |
| 7,593,921 B2 | 9/2009 | Goronzy et al. | |
| 7,603,349 B1 | 10/2009 | Kraft et al. | |
| 7,617,176 B2 | 11/2009 | Zeng et al. | |
| 7,634,461 B2 | 12/2009 | Oral et al. | |
| 7,657,518 B2 | 2/2010 | Budzik et al. | |
| 7,664,734 B2 | 2/2010 | Lawrence et al. | |
| 7,685,192 B1 | 3/2010 | Scofield et al. | |
| 7,716,158 B2 | 5/2010 | McConnell | |
| 7,716,199 B2 | 5/2010 | Guha | |
| 7,793,326 B2 | 9/2010 | McCoskey | |
| 8,060,905 B1 | 11/2011 | Hendricks | |
| 8,065,697 B2 | 11/2011 | Wright et al. | |
| 8,115,869 B2 | 2/2012 | Rathod et al. | |
| 8,176,068 B2 | 5/2012 | Kunjithapatham et al. | |
| 2001/0003214 A1 | 6/2001 | Shastri et al. | |
| 2001/0023433 A1 | 9/2001 | Natsubori et al. | |
| 2002/0022491 A1 | 2/2002 | McCann et al. | |
| 2002/0026436 A1 | 2/2002 | Joory | |
| 2002/0087535 A1 | 7/2002 | Kotcheff et al. | |
| 2002/0099744 A1* | 7/2002 | Coden et al. | 707/531 |
| 2002/0161767 A1 | 10/2002 | Shapiro et al. | |
| 2002/0162121 A1 | 10/2002 | Mitchell | |
| 2002/0184267 A1* | 12/2002 | Nakao | 707/515 |
| 2003/0028889 A1 | 2/2003 | McCoskey | |
| 2003/0033273 A1 | 2/2003 | Wyse | |
| 2003/0033333 A1* | 2/2003 | Nishino et al. | 707/531 |
| 2003/0050778 A1* | 3/2003 | Nguyen et al. | 704/235 |
| 2003/0105682 A1 | 6/2003 | Dicker et al. | |
| 2003/0131013 A1 | 7/2003 | Pope et al. | |
| 2003/0158855 A1 | 8/2003 | Farnham et al. | |
| 2003/0172075 A1 | 9/2003 | Reisman | |
| 2003/0184582 A1 | 10/2003 | Cohen | |
| 2003/0221198 A1 | 11/2003 | Sloo | |
| 2003/0229900 A1 | 12/2003 | Reisman | |
| 2003/0231868 A1 | 12/2003 | Herley | |
| 2004/0031058 A1 | 2/2004 | Reisman | |
| 2004/0073944 A1 | 4/2004 | Booth | |
| 2004/0194141 A1 | 9/2004 | Sanders | |
| 2004/0244038 A1 | 12/2004 | Utsuki et al. | |
| 2004/0249790 A1 | 12/2004 | Komamura | |
| 2005/0004910 A1 | 1/2005 | Trepess | |
| 2005/0137996 A1 | 6/2005 | Billsus et al. | |
| 2005/0144158 A1 | 6/2005 | Capper et al. | |
| 2005/0154711 A1 | 7/2005 | McConnell | |
| 2005/0160460 A1 | 7/2005 | Fujiwara et al. | |
| 2005/0177555 A1 | 8/2005 | Alpert et al. | |
| 2005/0240580 A1 | 10/2005 | Zamir et al. | |
| 2005/0246726 A1 | 11/2005 | Labrou et al. | |
| 2005/0289599 A1 | 12/2005 | Matsura et al. | |
| 2006/0026152 A1 | 2/2006 | Zeng et al. | |
| 2006/0028682 A1 | 2/2006 | Haines | |
| 2006/0036593 A1 | 2/2006 | Dean et al. | |
| 2006/0066573 A1 | 3/2006 | Matsumoto | |
| 2006/0074883 A1 | 4/2006 | Teevan et al. | |
| 2006/0084430 A1 | 4/2006 | Ng | |
| 2006/0095415 A1 | 5/2006 | Sattler et al. | |
| 2006/0106764 A1 | 5/2006 | Girgensohn et al. | |
| 2006/0112055 A1* | 5/2006 | Tapio et al. | 706/46 |
| 2006/0133391 A1 | 6/2006 | Kang et al. | |
| 2006/0136670 A1 | 6/2006 | Brown et al. | |
| 2006/0156326 A1 | 7/2006 | Goronzy et al. | |
| 2006/0161542 A1 | 7/2006 | Cucerzan et al. | |
| 2006/0195362 A1 | 8/2006 | Jacobi et al. | |
| 2006/0212479 A1* | 9/2006 | Habas et al. | 707/104.1 |
| 2006/0212897 A1 | 9/2006 | Li et al. | |
| 2006/0242283 A1 | 10/2006 | Shaik et al. | |
| 2007/0043703 A1 | 2/2007 | Bhattacharya et al. | |
| 2007/0050346 A1 | 3/2007 | Goel et al. | |
| 2007/0061222 A1 | 3/2007 | Allocca et al. | |
| 2007/0061352 A1 | 3/2007 | Dimitrova et al. | |
| 2007/0073894 A1 | 3/2007 | Erickson et al. | |
| 2007/0078822 A1 | 4/2007 | Cuzerzan et al. | |
| 2007/0106500 A1* | 5/2007 | Loofbourrow et al. | 704/10 |
| 2007/0107019 A1 | 5/2007 | Romano et al. | |
| 2007/0124752 A1* | 5/2007 | Sakai | 725/8 |
| 2007/0130585 A1 | 6/2007 | Perret et al. | |
| 2007/0143266 A1 | 6/2007 | Tang et al. | |
| 2007/0156447 A1 | 7/2007 | Kim et al. | |
| 2007/0179776 A1 | 8/2007 | Segond et al. | |
| 2007/0198485 A1 | 8/2007 | Ramer et al. | |
| 2007/0198500 A1 | 8/2007 | Lucovsky et al. | |
| 2007/0198508 A1 | 8/2007 | Yoshimura | |
| 2007/0208719 A1* | 9/2007 | Tran | 707/3 |
| 2007/0214123 A1 | 9/2007 | Messer et al. | |
| 2007/0214488 A1 | 9/2007 | Nguyen et al. | |
| 2007/0220037 A1 | 9/2007 | Srivastava et al. | |
| 2007/0233287 A1 | 10/2007 | Sheshagiri et al. | |
| 2007/0300078 A1 | 12/2007 | Ochi et al. | |
| 2008/0021860 A1* | 1/2008 | Wiegering et al. | 707/1 |
| 2008/0040316 A1 | 2/2008 | Lawrence | |
| 2008/0077569 A1* | 3/2008 | Lee et al. | 707/5 |
| 2008/0082744 A1 | 4/2008 | Nakagawa | |
| 2008/0086754 A1* | 4/2008 | Chen et al. | 725/105 |
| 2008/0092168 A1* | 4/2008 | Logan et al. | 725/44 |
| 2008/0114751 A1 | 5/2008 | Cramer et al. | |
| 2008/0133501 A1 | 6/2008 | Andersen et al. | |
| 2008/0133504 A1 | 6/2008 | Messer et al. | |
| 2008/0162651 A1 | 7/2008 | Madnani | |
| 2008/0162731 A1 | 7/2008 | Kauppinen et al. | |
| 2008/0183596 A1 | 7/2008 | Nash et al. | |
| 2008/0183681 A1 | 7/2008 | Messer et al. | |
| 2008/0183698 A1 | 7/2008 | Messer et al. | |

(56) References Cited

U.S. PATENT DOCUMENTS

| | | |
|---|---|---|
| 2008/0204595 A1 | 8/2008 | Rathod et al. |
| 2008/0208839 A1 | 8/2008 | Sheshagiri et al. |
| 2008/0235209 A1 | 9/2008 | Rathod et al. |
| 2008/0235393 A1 | 9/2008 | Kunjithapatham et al. |
| 2008/0242279 A1 | 10/2008 | Ramer et al. |
| 2008/0250010 A1 | 10/2008 | Rathod et al. |
| 2008/0266449 A1 | 10/2008 | Rathod et al. |
| 2008/0288641 A1 | 11/2008 | Messer et al. |
| 2008/0313146 A1 | 12/2008 | Wong et al. |
| 2009/0029687 A1 | 1/2009 | Ramer et al. |
| 2009/0055393 A1 | 2/2009 | Messer et al. |
| 2009/0063555 A1* | 3/2009 | Fisher et al. ............. 707/103 R |
| 2009/0077065 A1 | 3/2009 | Song et al. |
| 2009/0112848 A1 | 4/2009 | Kunjithapatham et al. |
| 2009/0327883 A1* | 12/2009 | Robertson et al. ............ 715/273 |
| 2010/0070895 A1 | 3/2010 | Messer |
| 2010/0091182 A1 | 4/2010 | Gibbon et al. |
| 2010/0191619 A1 | 7/2010 | Dicker et al. |
| 2010/0293165 A1 | 11/2010 | Eldering et al. |
| 2011/0040767 A1* | 2/2011 | Kunjithapatham et al. ... 707/749 |
| 2011/0202537 A1* | 8/2011 | Shamma et al. ............. 707/741 |
| 2011/0314485 A1 | 12/2011 | Abed |
| 2012/0030201 A1* | 2/2012 | Pickering et al. ............ 707/728 |
| 2012/0246016 A1* | 9/2012 | Hubinette .................. 705/14.73 |
| 2013/0091090 A1* | 4/2013 | Spivack et al. ................ 707/608 |
| 2013/0262106 A1* | 10/2013 | Hurvitz et al. ................ 704/235 |
| 2013/0290892 A1* | 10/2013 | Basapur et al. ............... 715/772 |

FOREIGN PATENT DOCUMENTS

| | | |
|---|---|---|
| CN | 1723458 | 1/2006 |
| CN | 1808430 | 7/2006 |
| EP | 0848554 | 6/1998 |
| JP | 06-309362 | 11/1994 |
| JP | 2000-242661 | 9/2000 |
| JP | 2003-099442 | 4/2003 |
| JP | 2006186426 | 7/2006 |
| JP | 2003-242176 | 8/2009 |
| KR | 10-2002-0005147 | 1/2002 |
| KR | 10-2002-0006810 | 1/2002 |
| KR | 10-2004-0052339 | 6/2004 |
| KR | 10-2006-0027226 | 3/2006 |
| WO | WO 01/37465 | 5/2001 |
| WO | 02/11446 | 2/2002 |
| WO | WO 02/43310 | 5/2002 |
| WO | WO 03/042866 | 5/2003 |
| WO | WO 2005/055196 | 6/2005 |
| WO | WO 2007/004110 | 1/2007 |

OTHER PUBLICATIONS

European Search Report dated Aug. 2, 2012 for European Application No. 08704995.3 from European Patent Office, pp. 1-6, Rijswijk, Netherlands.
U.S. Office Action for U.S. Appl. No. 13/470,112 mailed Oct. 15, 2012, United States.
U.S. Final Office Action for U.S. Appl. No. 12/263,089 mailed Sep. 27, 2012, United States.
Chinese Office Action dated Nov. 5, 2012 from Chinese Application No. 200880003361.4 from China Patent Office, pp. 1-22, People's Republic of China (English language translation included, pp. 10-22).
U.S. Advisory Action for U.S. Appl. No. 12/263,089 mailed Dec. 14, 2012.
U.S. Final Office Action dated Dec. 5, 2013 from U.S. Appl. No. 13/470,112.
Japanese Office Action dated May 29, 2012 from Japanese Application No. 2007-337479 from Japanese Patent Office, pp. 1-3, Tokyo, Japan (English language translation included, pp. 2-3).
Japanese Office Action dated Dec. 4, 2012 from Japanese Application No. 2007-337479 from Japanese Patent Office, pp. 1-3, Tokyo, Japan (English language translation included, pp. 2-3).
Apple Inc., Apple iTunes, http://www.apple.com/itunes/, Apr. 28, 2003, 2 pages, United States.
Babaguchi, N. et al., "Intermodal Collaboration: A Strategy for Semantic Content Analysis for Broadcasted Sports Video," IEEE International Conference on Image Processing, Sep. 2003, pp. 13-16, vol. 1, Barcelona, Spain.
Brill, E., "A Simple Rule-Based Part of Speech Tagger," Third Conference on Applied Natural Language Processing, Mar. 1992, pp. 152-155, Trento, Italy.
Google Inc., Google Search Engine, http://www.google.com, downloaded Sep. 19, 2008, 1 page, United States.
Google Inc., Google Desktop Search, http://desktop.google.com, downloaded Sep. 19, 2008, 1 page, United States.
Henzinger, M. et al., "Query-Free News Search," Proceedings of the 12th International Conference on World Wide Web, May 20-24, 2003, Budapest, Hungary, ACM Press, New York, NY, May 2003, pp. 1-10, United States.
Livingston, K. et al., "Beyond Broadcast: A Demo," Proceedings of the 8th international Conference on Intelligent User Interfaces, Jan. 12-15, 2003, Miami, Florida, USA, ACM Press, New York, NY, Jan. 2003, p. 325, United States.
Microsoft Corporation, Microsoft Windows Media Player, http://www.microsoft.com/windows/windowsmedia/, downloaded Sep. 19, 2008, 1 page, United States.
Microsoft Corporation, MSN TV, http://www.webtv.com/pc, Sep. 19, 2008, 1 page, United States.
Opera Software ASA, Opera Browser for Devices, http://www.opera.com/products/devices/,Sep. 19, 2008, 2 pages, United States.
Rau, L.F. et al, "Domain-Independent Summarization of News," In Summarizing Text for Intelligent Communication, Jun. 1994, pp. 71-75, Dagstuhl, Germany.
Spalti, M., "Finding and Managing Web Content with Copernic 2000," Library Computing, vol. 18, No. 3, Westport, Sep. 2000, pp. 217-221, United States.
Tjondronegoro, D. et al., "Extensible Detection and Indexing of Highlight Events in Broadcasted Sports Video," Proceedings of the 29th Australasian Computer Science Conference, Hobart, Tazmania, Australia, Conferences in Research and Practice in Information Technology, vol. 48, Australasian Computer Society Inc., Jan. 2006, pp. 1-1 0, Sydney, Australia.
Wachman, J. et al., "Tools for Browsing a TV Situation Comedy Based on Content Specific Attributes," Multimedia Tools and Applications, vol. 13, No. 3, Kluwer Academic Publishers, Boston, Massachusetts, Mar. 2001, pp. 255-284, United States.
Yahoo! Inc., http://search.yahoo.com, downloaded Sep. 19, 2008, 1 page, United States.
Zhuang, Y. et al, "Applying Semantic Association to Support Content-Based Video Retrieval," International Workshops on Very Low Bitrate Video Coding (VLBV 1998), Oct. 1998, pp. 1-4, United States.
U.S. Non-final Office Action for U.S. Appl. No. 12/056,184 mailed on Jun. 11, 2010.
U.S. Final Office Action for U.S. Appl. No. 12/056,184 mailed on Nov. 23, 2010.
U.S. Non-Final Office Action for U.S. Appl. No. 11/726,340 mailed May 19, 2009.
U.S. Non-final Office Action for U.S. Appl. No. 11/732,887 mailed on Jun. 5, 2009.
Livingston, K. et al., "Beyond Broadcast," 8th International Conference on Intelligent User Interfaces, Jan. 2003, pp. 260-262, Association for Computing Machinery, New York, NY.
Microsoft Corporation, Microsoft Windows Media Player 10, http://www.microsofl.com/windows/windowsmediaImpl0, Sep. 19, 2008, US.
Realnetworks, Inc., http://www.reaI.com, Sep. 19, 2008, US.
Copernic Inc., http://copernic.com/en/products/desktop-search/index.html, Sep. 18, 2008.
Copernic Inc., Copernic Search Engine for your PC, http://www.copernic.com, Sep. 19, 2008, US.
Miyamori, H. et al., "Webified Video: Media Conversion from TV Programs to Web Content for Cross-Media Information Integration,"

(56) References Cited

OTHER PUBLICATIONS

Proceedings of the 16th International Conference on Database and Expert Systems Applications, 2005, pp. 176-185, Springer-Verlag, Berlin, Heidelberg.

Moraveji, N. et al., "DynaLine: A Non-Disruptive TV User Interface for Passive Browsing of Internet Video," Microsoft Research Technical Report, 2006, pp. 1-4.

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

Notification of Transmittal of the International Search Report and the Written Opinion of the International Searching Authority for International Application No. PCT/KR2008/001558, dated Jun. 26, 2008, 10 pages.

U.S. Final Office Action for U.S. Appl. No. 11/969,778 mailed on Sep. 2, 2010.

U.S. Non-final Office Action for U.S. Appl. No. 11/969,778 mailed on Apr. 19, 2010.

Notification of Transmittal of the International Search Report and the Written Opinion of the International Searching Authority; International Search Report and Written Opinion of the International Searching Authority for Application No. PCT/KR2008/000537 dated May 15, 2008, 16 pages.

Chinese Office Action dated Aug. 14, 2009 issued in Chinese Patent Application No. 2008100826213 (English language translation included).

U.S. Non-final Office Action for U.S. Appl. No. 11/803,826 mailed on Jul. 24, 2009.

Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.

U.S. Final Office Action for U.S. Appl. No. 11/633,880 mailed Oct. 28, 2010.

U.S. Final Office Action for U.S. Appl. No. 11/713,350 mailed Sep. 9, 2010.

U.S. Non-final Office Action for U.S. Appl. No. 11/633,880 mailed May 11, 2010.

AOL LLC, http://www.aol.com, downloaded Sep. 19, 2008, pp. 1-2, United States.

Ask Search Engine, http://www.ask.com, downloaded Sep. 19, 2008, pp. 1, United States.

U.S. Advisory Action for U.S. Appl. No. 11/633,880 mailed Nov. 25, 2009.

U.S. Non-final Office Action for U.S. Appl. No. 11/900,847 mailed Oct. 28, 2009.

"Placement in the DMOZ.org directory—Pure Power", DMOZ / Google Directory, posted on Apr. 30, 2005, p. 1, http://www.ahfx.net/weblog/13.

U.S. Office Action for U.S. Appl. No. 11/633,880 mailed Jan. 6, 2009.

U.S. Office Action for U.S. Appl. No. 11/633,880 mailed Aug. 10, 2009.

U.S. Final Office Action for U.S. Appl. No. 11/713,350 mailed Mar. 2, 2009.

U.S. Final Office Action for U.S. Appl. No. 11/713,350 mailed Aug. 14, 2009.

U.S. Non-final Office Action for U.S. Appl. No. 11/725,865 mailed Oct. 16, 2009.

U.S. Final Office Action for U.S. Appl. No. 11/725,865 mailed Mar. 16, 2010.

U.S. Non-final Office Action for U.S. Appl. No. 11/713,350 mailed Mar. 8, 2010.

U.S. Non-final Office Action for U.S. Appl. No. 11/803,826 mailed on Mar. 3, 2010.

U.S. Office Action for U.S. Appl. No. 11/726,340 mailed Oct. 14, 2010.

U.S. Office Action for U.S. Appl. No. 11/726,340 mailed Feb. 14, 2011.

U.S. Office Action for U.S. Appl. No. 11/726,340 mailed Dec. 9, 2009.

U.S. Office Action for U.S. Appl. No. 12/263,089 mailed Mar. 25, 2011.

U.S. Office Action for U.S. Appl. No. 11/732,887 mailed on Dec. 4, 2009.

U.S. Office Action for U.S. Appl. No. 11/725,865 mailed Mar. 4, 2011.

U.S. Office Action for U.S. Appl. No. 11/633,880 mailed Mar. 17, 2011.

U.S. Office Action for U.S. Appl. No. 11/803,826 mailed Jun. 1, 2011.

U.S. Office Action for U.S. Appl. No. 11/969,778 mailed Jun. 15, 2011.

Office Action dated Jun. 27, 2011 from U.S. Appl. No. 11/725,865.

Office Action dated Jul. 6, 2011 from U.S. Appl. No. 11/789,609.

Office Action dated Oct. 6, 2010 from U.S. Appl. No. 11/981,019.

Office Action dated Dec. 29, 2009 from U.S. Appl. No. 11/981,019.

Final Office Action dated Mar. 16, 2011 from U.S. Appl. No. 11/981,019.

Final Office Action dated Jun. 17, 2010 from U.S. Appl. No. 11/981,019.

Office Action dated Aug. 2, 2011 from U.S. Appl. No. 11/713,312.

Google Inc., webhp, http://www.google.com/webhp?complete-1&hl-en, downloaded Sep. 25, 2008, p. 1.

Office Action dated Mar. 25, 2010 from Chinese Patent Application No. 200810082621.3, 7pp., China (English-language translation included—15 pp).

Tivo Inc., http://www.tivo.com, downloaded Sep. 19, 2008, 1 page.

"Computing Meng Individual Project, ANSES—Automatic News Summarization and Extraction System," http://mmis.doc.ic.ac.uk/pr-1.wong-2002/overview.html, downloaded Sep. 24, 2008, 4 pages.

Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.

Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.

Miura, K. et al., "Automatic Generation of a Multimedia Encyclopedia from TV Programs by Using Closed Captions and Detecting Principal Viedo Objects," Proceedings of the Eigth IEEE International Sympsosium on Miltumedia (ISM '06), 2006, IEEE, 8 pages.

Office Action dated Aug. 19, 2011 from U.S. Appl. No. 11/821,938.

Office Action dated Aug. 22, 2011 from U.S. Appl. No. 11/981,019.

Final Office Action dated Sep. 1, 2011 from U.S. Appl. No. 12/263,089.

Office Action dated Sep. 8, 2011 from U.S. Appl. No. 12/544,994.

Final Office Action dated Sep. 21, 2011 from U.S. Appl. No. 11/633,880.

Final Office Action dated Sep. 27, 2011 from U.S. Appl. No. 11/969,778.

Notice of Allowance dated Nov. 1, 2011 from U.S. Appl. No. 11/821,938.

Ricci et al. "*Acquiring and Revising Preferences in a Critique-Based Mobile Recommender System.*" Journal IEEE Intelligent Systems, vol. 22 Issue 3, May 2007.

Chinese Office Action dated Dec. 14, 2010 from Chinese Application No. 20088003361.4.

Chinese Office Action dated Aug. 14, 2009 from Chinese Application No. 2008100826213.

Chinese Office Action dated Mar. 25, 2010 from Chinese Application No. 2008100826213.

Chinese Office Action dated Feb. 1, 2011 from Chinese Application No. 200710196237.1.

Notice of Allowance dated Dec. 6, 2011 from U.S. Appl. No. 11/789,609.

(56) References Cited

OTHER PUBLICATIONS

Office Action dated Dec. 15, 2011 from U.S. Appl. No. 12/263,089.
Notice of Allowance dated Mar. 2, 2012 from U.S. Appl. No. 11/789,609.
Notice of Allowance dated Mar. 21, 2012 from U.S. Appl. No. 11/969,778.
Zhu et al., Automatic news video segmentation and categorization based on closed-captioned text, IEEE International Conference on Multimedia an Expo 2001, pp. 829-832, Aug. 22-25, 2001.
Ma et al., Context-Sensitive Complementary Information Retrieval for Text Stream, Database and Expert Systems Applications, Springer Berlin/ Heidelberg, pp. 471-481, 2005.
Office Action dated May 25, 2012 from U.S. Appl. No. 12/263,089.
Notification of Granting of Patent Right to Invention dated Jul. 23, 2013 from Chinese Application No. 200880003361.4 from the State Intellectual Property Office of P.R. China, pp. 1-8, Beijing, China (English language translation included, pp. 1-4).
U.S. Non-Final Office Action dated Jul. 19, 2013 from U.S. Appl. No. 12/263,089.
U.S. Non-Final Office Action dated Apr. 9, 2013 from U.S. Appl. No. 13/470,112.
U.S. Final Office Action dated Mar. 19, 2014 from U.S. Appl. No. 12/263,089.
U.S. Notice of Allowance dated Mar. 14, 2014 from U.S. Appl. No. 13/470,112.
Korean Office Action dated May 28, 2014 for Korean Application No. 10-2008-7025301 from Korean Intellectual Property Office, pp. 1-12, Daejeon, Republic of Korea (Machine-generated English-language translation attached, pp. 6-12).

\* cited by examiner

METHOD AND SYSTEM FOR PROVIDING ACCESS TO INFORMATION OF POTENTIAL INTEREST TO A USER

CROSS-REFERENCE TO RELATED APPLICATIONS

This application is a continuation-in-part of prior, co-pending U.S. patent application Ser. No. 11/789,609, filed on Apr. 25, 2007, which is incorporated herein by reference in its entirety for all purposes.

FIELD OF THE INVENTION

The present invention relates to a method and a system for providing users access to information of interest.

BACKGROUND OF THE INVENTION

The number of networked devices in local area networks such as home networks is on the rise, and so is the amount of data stored on them. Typically, home network users store and access several types of content (such as audio, video, image and other data files) in different formats on/via their home devices. In addition to accessing these, home users also commonly access audio/video broadcast data streams via broadcast television or cable networks.

Further, the amount of information available on sources such as external networks, the Internet (e.g., the World Wide Web), etc. is continually on the rise. For example, it is very likely that a user can find useful information on the Internet related to at least some of the data stored on the devices in the user's home network. It is highly likely that the user can find large quantities of such related information in different formats (structured, semi-structured and unstructured) via multiple sources.

However, there is no system available that would allow a user to access such related information easily and seamlessly. The only way a user can achieve this is by manually performing a search for the desired information using an Internet search engine or by directly accessing a website (through a Web browser) that the user believes may contain such related information. Thus, the user is forced to comprehend and analyze large quantities of information to identify/access the exact information the user is looking for.

There are existing approaches in which a user can obtain information in a network of resources. In one approach, the user requests the information. The user specifies information using keywords and then browses the information to find the piece of information that satisfies the user's needs. However, specifying keywords using devices without keyboards, such as consumer electronics (CEs) devices, can be a tedious task.

Another approach involves a configuration that uses a TV and a PC. The PC analyzes the subtitles of the TV program and categorizes the program as general, news, medical, etc. The hierarchy of categories is fixed and built from questions posed to broadcast TV viewers. Content of a particular program is mapped to a fixed number of categories. The user can view additional information only when the content matches one of the specified categories. Queries are linked to fixed sources, limiting the amount of information that can be retried for the user. Further, the PC is required and the system cannot function when the PC is turned off. There is, therefore, a need for a method and a system for analyzing and obtaining information of interest to the user, without limiting specific sources of information.

SUMMARY OF THE INVENTION

In one embodiment of the present invention, a method for extracting a sentence from on incoming stream of text corresponding to a program is provided, the method comprising: retrieving end-of-sentence punctuation marks for a language identified for the incoming stream of text; locating punctuation marks in the incoming stream of text that match one of more of the retrieved end-of-sentence punctuation marks; comparing characters around the located punctuation marks to a list of word-punctuation pairs for the identified language to determine when a located punctuation mark is a valid end-of-sentence punctuation marks as opposed to an invalid one not to be considered an end-of-sentence punctuation mark despite its presence in the retrieved end-of-sentence punctuation marks for the identified language; and for any located valid punctuation marks, identifying a group of words between located valid punctuation marks as sentences.

In another embodiment of the present invention, a method for identifying a language of an incoming stream of text corresponding to a program is provided, the method comprising: comparing the incoming stream of text against one or more character sets, each of the character sets identifying characters used in a different language; identifying stop words in the incoming stream of text and comparing the identified stop words with stop words corresponding to one or more languages; and identifying a particular language for the incoming stream of text based on a marched character set and identified stop words corresponding to the particular language.

In another embodiment of the present invention, a method for validating a topic extracted from a stream of text corresponding to a program is provided, the method comprising: locally validating the topic by comparing the topic against one or more local word lists; and remotely validating the topic by submitting the topic as a query to an Internet search engine and comparing the number of results received from the Internet search engine to a predefined threshold.

In another embodiment of the present invention, an apparatus is provided comprising: a closed-caption decoder configured to decode a raw closed caption stream for a program and produce closed caption text; a language detection module configured to determine a language for the closed caption text; a sentence detection module configured to determine sentences within the closed caption text; a tagger configured to tag keywords based in the closed caption text based on the determined language and based on determined sentences; a topic extractor configured to extract topics based on the tagged keywords; and a validation module configured to validate the extracted topics.

DETAILED DESCRIPTION

Figure 1:
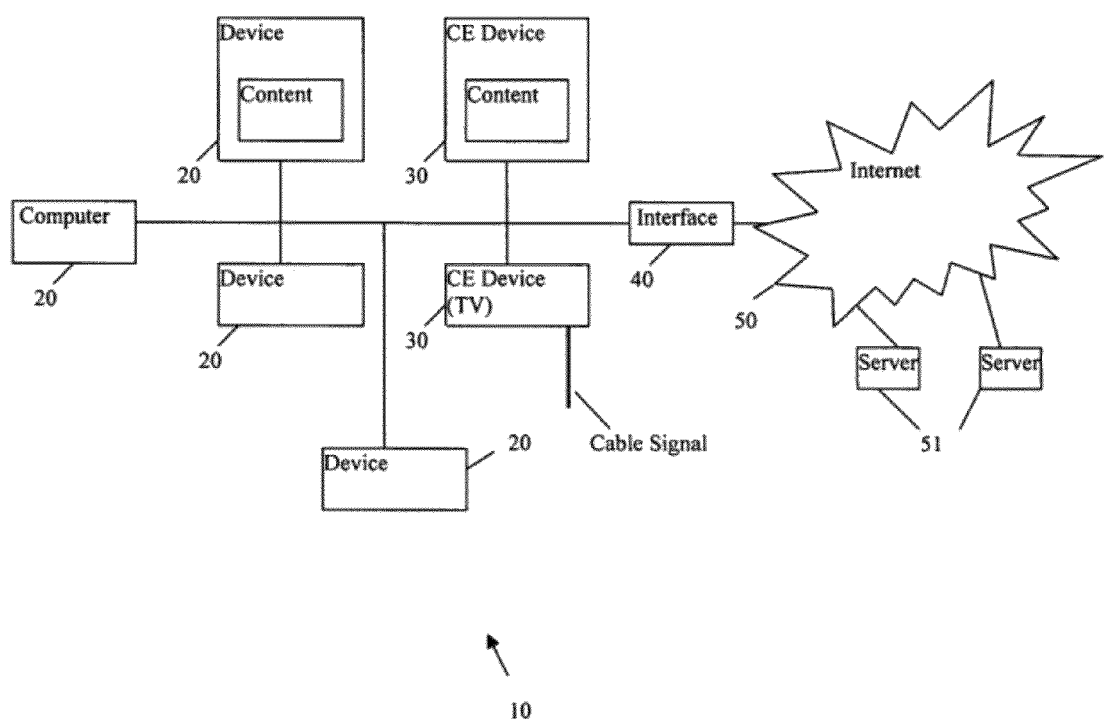
FIG. 1 shows an example of a network of electronic devices that implements an embodiment of the present invention.

The present invention provides a method and a system for analyzing and obtaining information of interest to a user, without limiting specific sources of information. Potential information that the user may be interested in is determined by monitoring the user's interactions with a device in a local network of devices, connected to an external network. Such a device can be a CE device in a local area network (e.g., a home network that is connected to the Internet).

In one implementation, this involves receiving close-captioned programming including closed-caption (CC) information, and analyzing the closed-caption information for key information indicating user interests. The key information is then used to find related information from sources of information such as the Internet, which the user may potentially be interested in.

On a typical CE device such as a TV, in the absence of a keyboard, it is difficult for a user to search for information on the Internet by entering keywords. If a user is watching a TV program, that is a good indication that the user is interested in the content of the TV program. Therefore, the content of the TV program is analyzed by gathering and analyzing text received as CC information for the TV program. Further, contextual information is gathered from the information about the channel being watched. The CC information and the contextual information can be combined and used to make recommendations to the user about information the user may potentially be interested in.

The gathered information is used to determine one or more keywords of potential interest to the user. The keywords are then used to search for related information on the Internet. For example, if the user is watching a news coverage involving Baltimore, the word "Baltimore" is extracted as a keyword. That keyword is used to form a query to search the Internet by using a search engine to find information, such as websites that include information about Baltimore city or Baltimore Ravens, etc.

The search results are presented to the user as recommendations, comprising potential search queries which may be selected by the user and executed to find further information on the Internet that may be of interest to the user. For example, while the user is watching a documentary on Antarctica on a TV, the keyword Antarctica is selected as a keyword and a search on the Internet returns "polar bears" as a recommendation of potential interest to the user. The user can then choose that recommendation to find more information about polar bears. If so, a query for "polar bears" is sent to a search engine and the results are displayed for the user.

Searching is not limited to a predetermined or fixed number of categories or queries or information sources. In one example, keywords are identified based on the CC information for searching. The keywords may be suggested to the user, wherein upon user selection, additional information is obtained using search engines that search available sources on the Internet (different websites available to the search engines), rather than a predetermined and/or a fixed number of sources such as one or more particular websites.

FIG. 1 shows a functional architecture of an example network 10, such as a local network (e.g., a home network), according to an embodiment of the present invention. The network 10 embodies a process for analyzing TV CC information to find related information on the Internet 50. The network 10 comprises electronic devices 20 which may include content, and CE devices 30 (e.g., TV, DVD player, cell phone, PDA, etc.) which may include content. The network 10 further includes an interface 40 that connects the network 10 to an external network 50 (e.g., another local network, the Internet, etc.). The external network 50 is connected to one or more servers 51. Though the devices 20 and 30 are shown separately, a single physical device can include one or more logical devices. As described further below, in one example, a process for analyzing TV CC information and suggesting information of interest to the user, according to the present invention can be implemented in a device 30 in FIG. 1.

The devices 20 and 30, respectively, can implement the UPnP protocol for communication there between. Those skilled in the art will recognize that the present invention is useful with other network communication protocols (e.g., Jini, HAVi, IEEE 1394, etc.). Further, the network 10 can be a wired network, a wireless network, or a combination thereof.

A system that implements a process for analyzing TV CC information receives a TV signal as input. The channel being viewed by the user is monitored and corresponding CC information that is a part of the TV signal is analyzed. Then, a set of keywords are determined which capture the gist of what is being viewed by the user.

Figure 2:
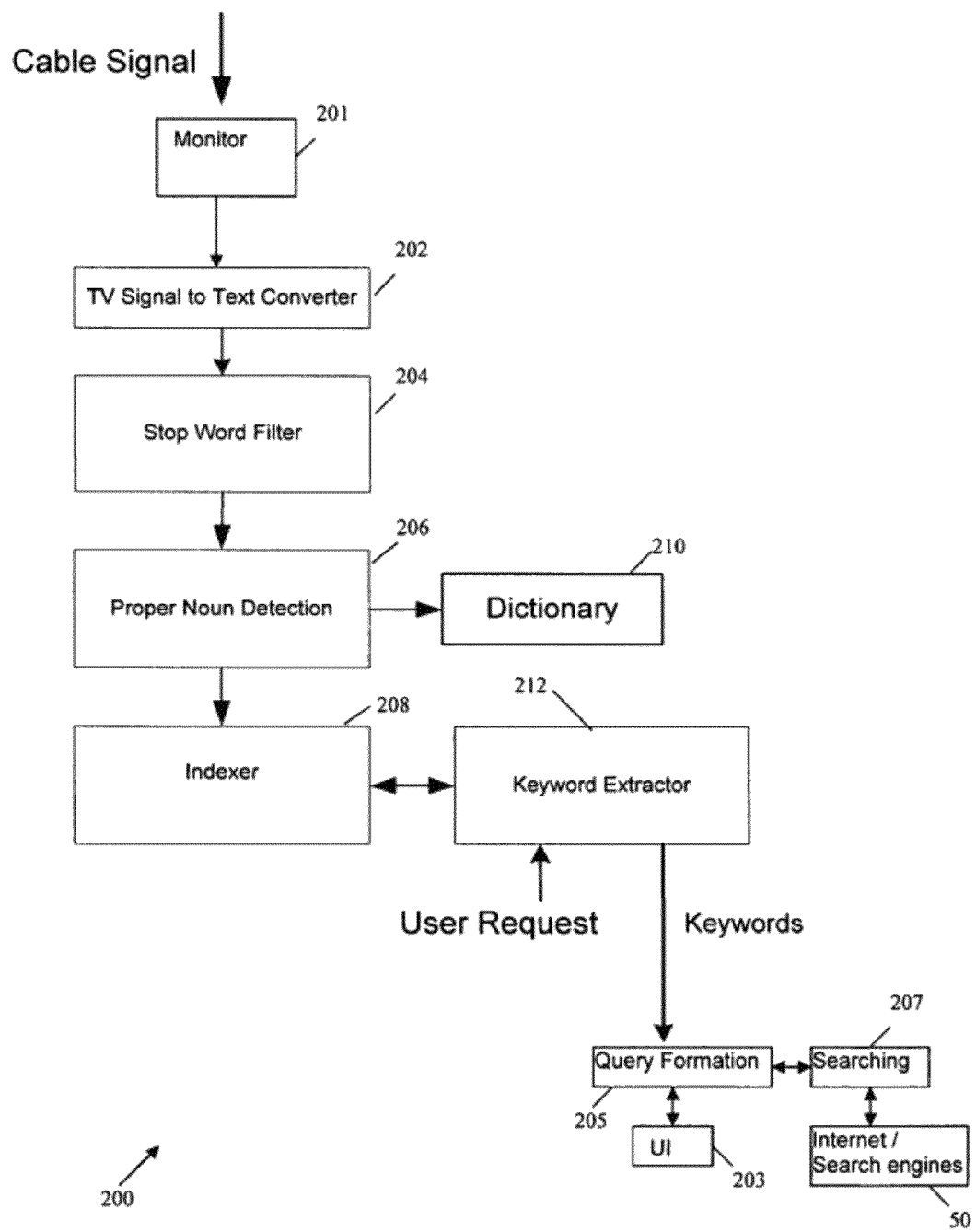
FIG. 2 shows a functional block diagram of an example system for analyzing TV closed-caption information to find related information on the Internet, according to an embodiment of the present invention.

FIG. 2 shows a functional block diagram of an example system 200 for analyzing TV CC information according to an embodiment of the present invention. The system 200 utilizes a channel monitor 201, a TV Signal to Text Converter 202, a Stop Word Filter 204, a Proper Noun Detector 206, an Indexer 208, a Dictionary 210 and a Keyword Extractor 212.

Figure 3A:
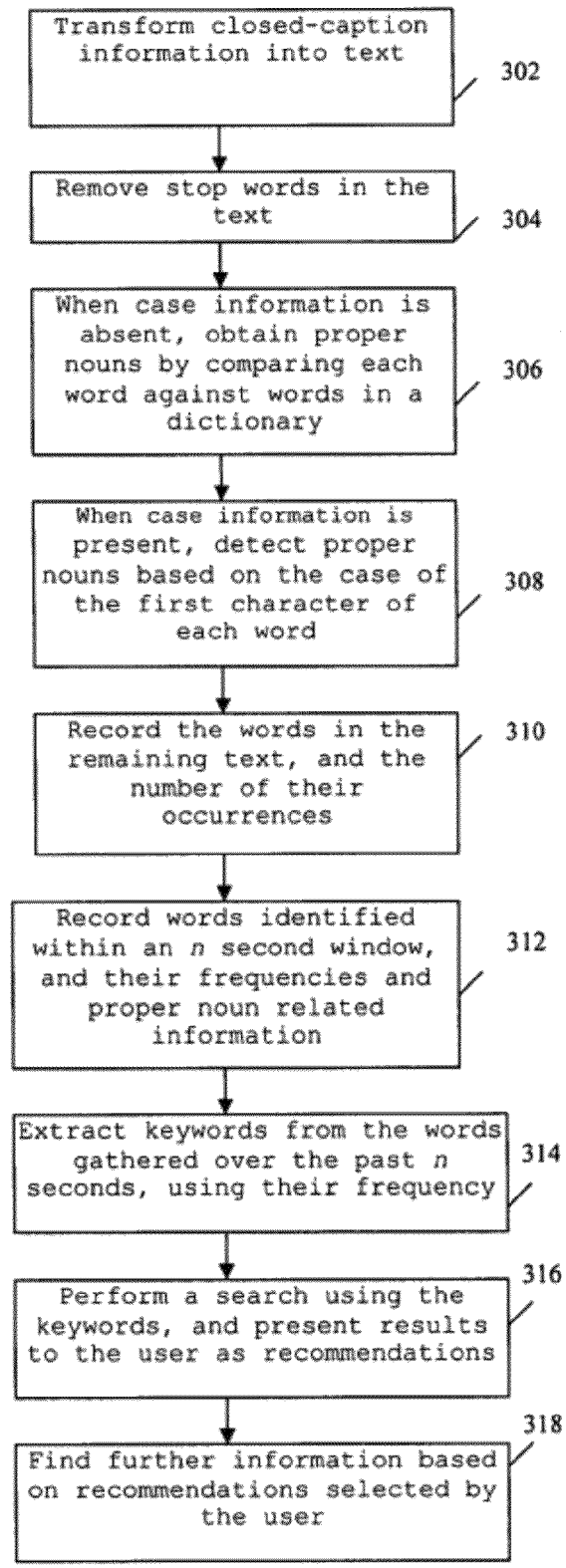
FIG. 3A shows a flowchart of example steps of a process for analyzing TV closed-caption information to find related information on the Internet, according to an embodiment of the present invention.

The monitor 201 monitors the TV/cable signal and determines channel information that is accessed/viewed by the user. That information includes CC information which is analyzed to extract words that capture the context, by utilizing the example process 300 in FIG. 3A. The example process 300 includes the steps of:

Step 302: The CC information transformed into text by the converter 202 using known transformation methods.

Step 304: The stop words in the text are removed by the Stop Word Filter 204. Stop words include words such as "of", "on", "the" etc., which have no meaning by themselves.

Step 306: Using the Proper Noun Detector 206, when case information is absent, proper nouns are detected (identified) by comparing each word in the remaining text against the Dictionary 210. Typically, proper nouns start with uppercase letters. On other occasions, the text obtained is case insensitive. The Dictionary 210 includes words that are not proper nouns. If the word under consideration is not present in the Dictionary 210, then it is assumed to be a proper noun. Proper nouns convey useful contextual information as they refer to specific names of people, places or things. Words identified as proper nouns are therefore tagged by the Proper Noun Detector 206 for ranking later.

Step 308: Using the Proper Noun Detector 206, when case information is present, proper nouns are detected based on the case of the first character of each word. Proper nouns are tagged by the Proper Noun Detector 206 for ranking later.

Step 310: The remaining words, and the number of their occurrences (frequency), is recorded by the Indexer 208.

More frequent words are important words, from which keywords will be selected. The record of words are reset as soon as the channel is changed or a topic change is discovered using special characters in the text obtained from the CC information.

Step 312: The Indexer 208 maintains words identified within an n second window (i.e., words received within an n second period of time, which may be the last n seconds) and their frequencies and proper noun related information. For example, an n=10 second window includes the words gathered in the past 10 seconds. The keywords indexed in step 310 cover the entire current TV program/story, etc., being watched, while the keywords discussed in this step, cover those gathered in the last 'n' seconds.

Step 314: The frequency of all words is used by the Keyword Extractor 212 to extract words (i.e., keywords) of interest from all words gathered from the past n seconds.

Step 316: The keywords are used for forming queries in a Query Formation module 205 for performing searches on available resources such as search engines on the Internet 50 by a Searching module 207. A User Interface (UI) module 203 presents the search results to the user as recommendations for optional further selection. Step 318: The user selects among the recommendations, wherein the selected recommendation are used by the Searching module 207 for searching the available resources for additional information of interest to the user. Such additional information is presented to the user by the UI module 203.

Steps 316 and 318 allow the user to find more information about a program that the user recently viewed on the TV, and can be repeated as the user desires to provide the user with additional and/or further refined information of interest to the user.

Figure 3B:
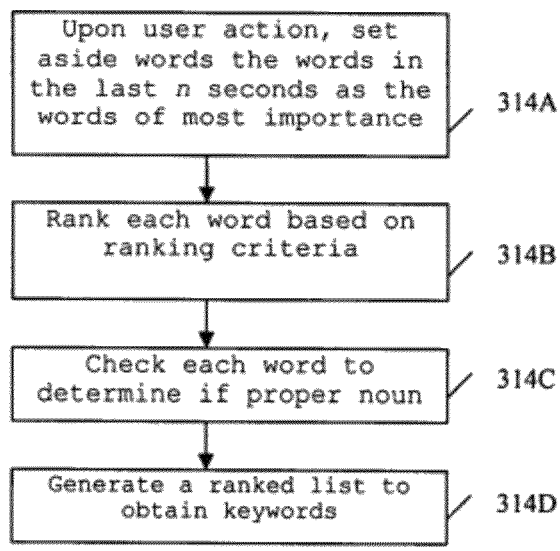
FIG. 3B shows a flowchart of example steps of keyword extraction in the process of FIG. 3A.

FIG. 3B shows an example flowchart of the steps performed by the extractor 212, including:

Step 314A: When the user activates a specific button on the TV control (e.g., a TV remote control), this provides a User Request that includes the user action. Upon a User Request, the words in the last n seconds are set aside as the words of most importance by the Keyword Extractor 212.

Step 314B: Further, each word is ranked based on its frequency or another ranking mechanism.

Step 314C: Each word is also checked for proper noun status, using the tag generated in steps 308 or 310.

Step 314D: A ranked list is produced wherein, in one example, high frequency words that are also proper nouns occupy the top of the list. Then follow the high frequency words and then words that are proper nouns. The top i words from the ranked list along with the high frequency words and the proper nouns identified since the start of the TV program, capture the context of what the user is watching. The information from the ranked list is used as keywords. Words captured in the n second window represent the context at a finer level of detail, whereas the proper nouns and high frequency words captured since the start of the program represent the context at a higher level.

Using Electronic Program Guide (EPG) information, which includes information about TV programs on cable TV, satellite TV, etc., the name of the channel being viewed, is used to frame the queries in steps 316, 318, along with the channel and program information. For example, when the user is viewing the "Panorama" program on BBC America, the words "Panorama" and "BBC America" are appended to the extracted keywords to provide related information in the context of the channel and program for searching.

Further, the extracted keywords can be converted into different languages and used for searching to find additional information on the Internet 50. Further, converting keywords, as opposed to sentences, from one language to the other is simple and can be done using a language-to-language dictionary. This is beneficial to users who may understand only a minor portion of the language in the TV program being watched.

Figure 4:
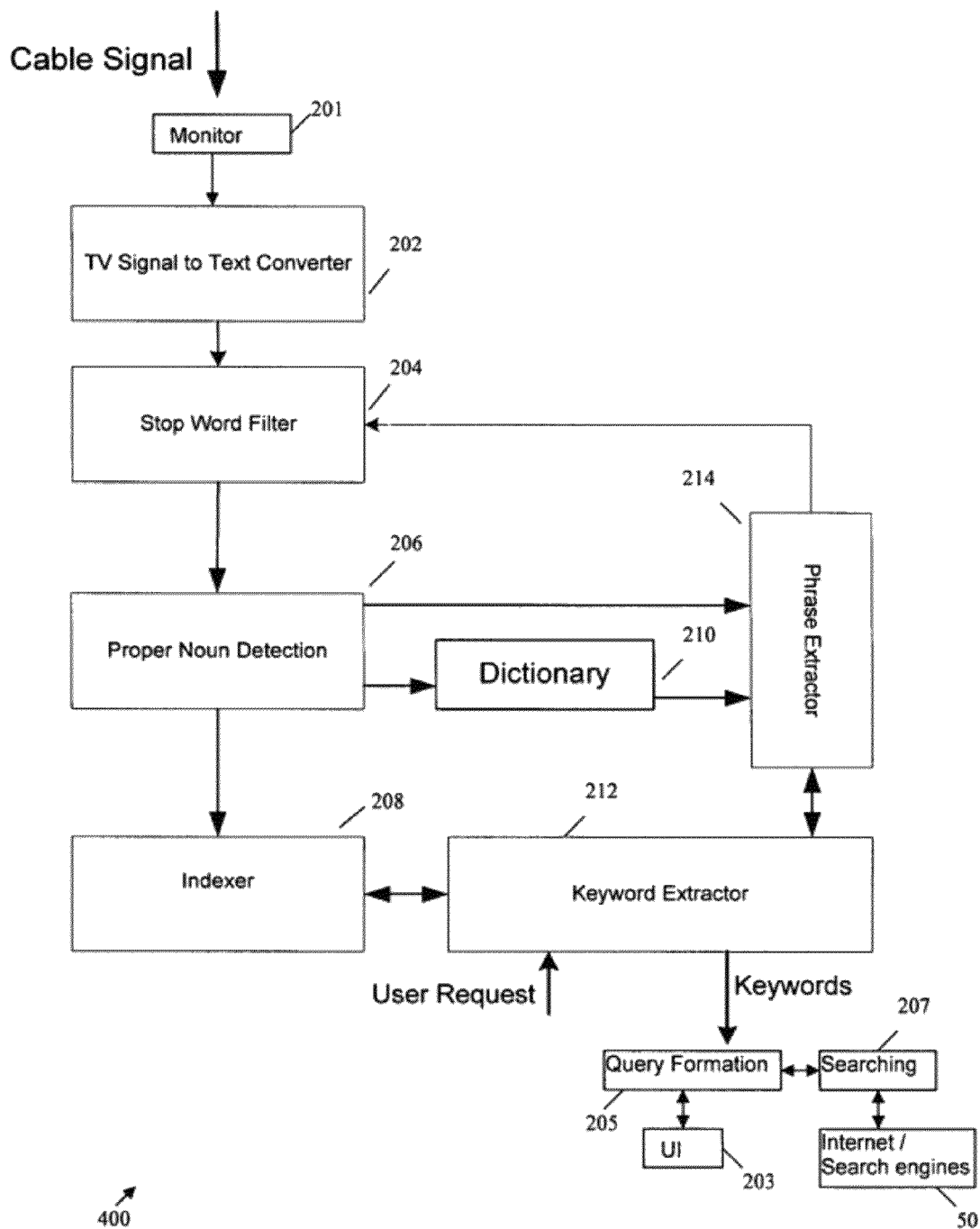
FIG. 4 shows a functional block diagram of another example system for analyzing TV closed-caption information to find related information on the Internet, according to another embodiment of the present invention.

FIG. 4 shows a functional block diagram of another example of a system 400 for analyzing TV CC information to find related information on the Internet, according to the present invention. The system 400 is a variation of system 200 in FIG. 2, and further includes a Phrase Extractor 214 to identify phrases, in addition to keywords. An example of a phrase can be "Baltimore Ravens" instead of the keywords "Baltimore" and "Ravens."

In this embodiment, the Keyword Extractor 212 not only relies on information from the Proper Noun Detector 206 and the Indexer 208, but also uses information from the Phrase Extractor 214 to obtain keywords. The Phrase Extractor 214 includes a phrase identifier function that identifies important phrases using frequency and co-occurrence information recorded by the Indexer 208, along with a set of rules. This is important in identifying multi-word phrases such as "United Nations", "Al Qaeda," etc.

In operation, the gathered CC text is first passed through the phrase identifier to capture phrases, and then the captured phrases are indexed. The phrase identifier internally maintains three lists: a list of proper nouns, a dictionary, and a list of stop words. The phrase identifier uses an N-gram based approach to phrase extraction, in which conceptually, to capture a phrase of length 'N' words, a window of size 'N' words is slid across the text and all possible phrases (of length 'N' words) are collected. Then they are passed through the following set of three rules to filter out meaningless phrases:

1. A word ending with punctuation cannot be in the middle of a phrase.
2. For a phrase length of two words or more, the first word cannot be a stop word other than the two articles: 'the' (definite), and 'a/an' (indefinite), and the rest of the words cannot be stop words other than conjunctive stop words like 'the', 'on', 'at', 'of', 'in', 'by', 'for', 'and,' etc. This is because the above mentioned stop words are often used to combine two or more words: e.g., "war on terror," "wizard of oz," "the beauty and the beast," etc.
3. Proper nouns and words not present in the dictionary are treated as meaningful phrases.

The Phrase Extractor 214 includes a term extractor function which extracts the highest score terms and phrases from the index. The terms and phrases are presented to the user and can be used for further searching to provide additional information of interest to the user.

Alternatively, the Phrase Extractor 214 includes a natural language processing (NLP) tagger and a set of extraction rules to extract important phrases. In operation, the NLP tagger tags each word in the closed caption text with its part-of-speech (i.e. whether the word is a 'noun,' 'adjective,' 'proper noun,' etc.) The extraction rules define the kinds of sequences of such tags that are important. For example, a rule can be to extract phrases which are "a sequence of more than one 'proper nouns'" and another rule can be to extract "a sequence of one or more 'adjectives' followed by one or more 'nouns'." The Phrase Extractor applies these rules to the text tagged by the part-of-speech tagger and extracts phrases that follow these sequences. It can also be used to extract single word keywords by using appropriate rules.

In one example, in FIGS. 2 and/or 4, all the elements except the Internet/Search Engine 50, reside on a CE device (e.g. CE device 30). In another example, in FIGS. 2 and/or 4, the Internet/Search Engine 50 resides on the Internet, the Dictionary 210 resides on the network (local or Internet), while the other elements reside on the CE device.

Although, in the examples provided herein, a TV is used to receive closed-caption information, the present invention can be applied to other devices (e.g., music player, etc.) that receive information that can be used for analysis to determine and search for information of interest to the user, according to the present invention.

Further, although in FIG. 1 a CE device 30 which is used to receive programming in including CC information, is shown connected to a home network, such a home network is not required and the CE device can be a stand-alone device that receives programming from cable, satellite, DSL, or other sources of programming, without connection to a home network. Such a stand-alone device need only be connected to sources of information such as connected to the Internet 50, without the need for a home/local network. Further, the present invention can be implemented in non-CE devices (e.g., a device 20 in FIG. 1) that may be a stand-alone device or connected to a home/local network. Further, although in the examples herein closed caption information is used for analysis and determination of user interests, in another implementation the present invention is useful with other types of information that represent the type of programming or content being accessed/viewed by a user.

Some natural language processing techniques, such as "part of speech tagging", require a complete sentence to be analyzed in order to correctly tag it. In such instances, it becomes important for the system to be able to parse an incoming stream of text into complete sentences, as opposed to merely looking for keywords or phrases. In an embodiment of the present invention, a sentence detection module is provided to perform this process.

The sentence detection module can use language specific end-of-sentence punctuation marks to locate the end of a sentence. For example, if the stream of text is in English, the module can use punctuation marks such as '.', '?', and '!', all of which typically (though not exclusively) signify the end of a sentence. If the stream of text is in Spanish, a different set of end-of-sentence punctuation marks can be used, such as '.', '¿,', and '¡'. Then, a language specific list of word-punctuation pairs that do not constitute the end of a sentence are used to check for "false positives", in other words situations where the typical end of sentence punctuation marks actually do not constitute an end of a sentence, such as 'Mr.', 'Mrs.', 'Ms.', 'P.O.', etc. If no such false positives are found, then the process can assume that an end of a sentence has been correctly identified.

In another embodiment of the present invention, the system can be configured to detect the language of an incoming stream of text. This is a useful adjunct to the sentence detection module embodiment described above, but also is independently useful because a number of natural language processing techniques, such as "part of speech tagging" and "stop words" are language-dependent. Therefore, in order to collect high-quality topics and to avoid selecting bad topics, it can be important to determine the language of the text.

A number of factors can be use to determine the language in the language detection module. The first such factor is character sets. There are certain characters that are unique to certain languages. In the easy case, some languages, such as Arabic and Hebrew have character sets made up entirely or nearly entirely of unique characters. In the harder cases, some languages, such as Spanish, French, and English, can have many common characters but at least a few unique characters to each language (such as é or ñ for Spanish). Identification of these unique characters in the stream of text can be used as an indicator of the language. Of course, such a factor may not be completely determinative. There may be some instances where characters from another language are used in a stream of text that is in English. A prime example is the present specification, which is in English but contains the Spanish characters reproduced above. Because of this, other factors must also be considered.

Another factor to be considered is a closed caption language descriptor. If the stream of text is from a television program closed caption stream, such closed caption streams typically include a descriptor element that explicitly states the language of the stream. If such a descriptor is present in the stream of text, it can be used as an indicator of the language of the stream.

Another factor to be considered are stop words. If the stream of text contains, for example, English stop words such as 'the' and 'of', then it may be English, whereas if it contains Spanish stop words such as 'el' and 'la' then it might be Spanish. Similar stop words can be identified for additional languages.

Another factor to be considered are tags returned by the Tagger for a text segment. If the ratio of words in a sentence marked as a proper noun to the total number of words in the sentence is greater than a threshold, then the language used in the tagger may be incorrect, in that it is more common to have a lower ration of proper nouns to other words in the sentence (common nouns, verbs, etc.). In other words, if the Tagger has identified a large number of proper nouns in the sentence, it may be that the tagger is using the wrong language and has misidentified common nouns and verbs as proper nouns.

Internally, the language detection module may maintain a confidence table that keeps track of the likelihood of each language being the current language of the program. The values are influenced by the factors mentioned above. The final determination of the current language is made by choosing the language having the highest confidence value.

In an embodiment of the present invention, there is an interdependent relationship between the sentence detection module and the language detection module. Detecting a sentence can be helpful in determining the language of the words in the sentence, but detecting the language can be helpful in determining when the sentence ends. As such, there may be much interplay between the sentence detection module and the language detection module in order to fulfill both goals. A feedback loop can be used in such instances. The feedback loop may first use the language detection module based on information already available. For example, the closed caption language descriptor or, if the program has not changed, use the language of the last sentence, this information may be used to derive a rough estimate of the language. This estimated language can then be used to detect a sentence. The extracted sentence may then be fed back to the language detection module to get a better estimate of the language. If the confidence increases and is more than a threshold, then the system can confidently use the topics extracted from the sentence. Otherwise, the confidence in the quality of the topics from these sentences is low.

In another embodiment of the present invention, TV programs can be categorized into genres. For example, a TV program can be factual or non-factual. Factual programs are those which are about real events, informational, educational, news, documentaries, etc. Non-factual programs are those that contain humor, emotions, such as sitcoms and dramas. Factual programs usually contain a lot of content that the user may be interested in finding more information about, such as names, locations, organization names, objects, etc. Non-factual programs have much less content in them, usually just names. Using the extraction rules that are designed for factual programs on non-factual programs can result in a lot of junk topics.

To overcome this problem, a table can be used that provides different extraction rules depending on the type of the program. This table may be called a genre-rules map. The mapping doesn't just discriminate between factual and non-factual, but instead has different extraction rules for many different genres. Indeed, the mapping is only limited based on the number of different genres that can be detected or determined. In one embodiment, the mapping is hierarchical, in that general genres can include sub-genres, each of which may have their own extraction rules.

The topic extractor looks at the genre of the program and asks the genre-rules map to provide it the rules for the genre. The result of using this map is improved quality of topics extracted, especially for non-factual programs such as sitcoms.

In another embodiment of the present invention, validation is performed, even once topics have been extracted, to ensure that the topics are of high quality. This may take place in two steps. In the first step, the topic can be checked against one or more local word lists, such as names and locations, to determine if it is a valid topic. This not only helps validate the topic, but also provides semantics for the topic. For example, if the topic is found in a local locations list, then the topic is known to be a location and this information can be used to determine what additional information to provide to the user (e.g., open a weather application or widget and search the identified location). This step is known as local validation or semantic tagging.

In the second step, the topic is checked against online sources to determine its validity. It may be sent as a query to a search engine to check the number of results returned. If there are very few results, such as only 10-20, then the topic may be invalid. This may be caused, for example, if there are junk characters in the closed caption stream. Using this second step, many low quality topics can be removed. This also can aid the system in obtaining topics for which useful services can actually be provided. For example, even if the topic is a valid location like Paris, the weather widget may be only be able to show weather for U.S. addresses, and thus the topic should be ignored.

Figure 5:
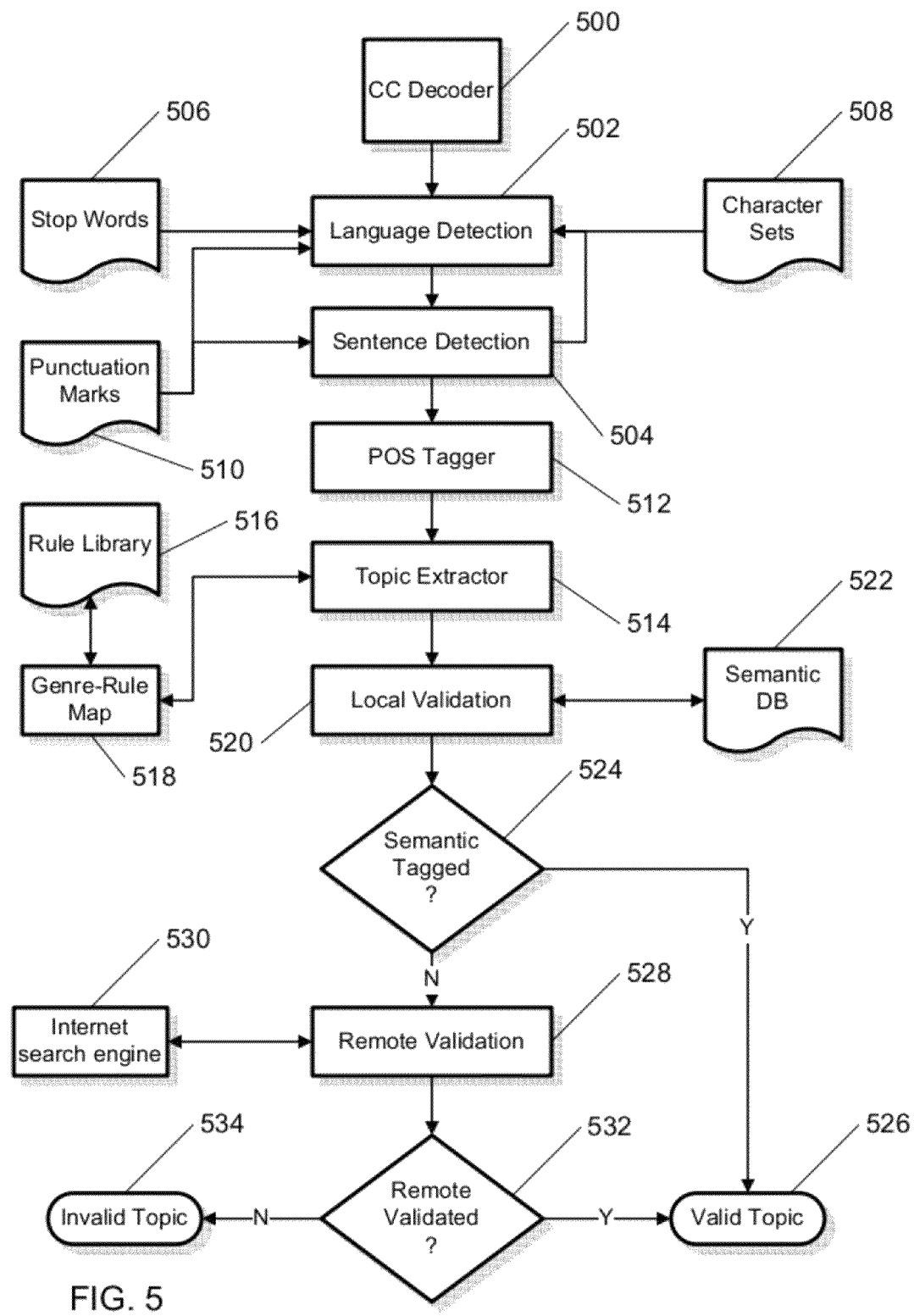
FIG. 5 is a flow diagram illustrating how these last few embodiments can be incorporated into a topic determination process in accordance with an embodiment of the present invention.

FIG. 5 is a flow diagram illustrating how these last few embodiments can be incorporated into a topic determination process in accordance with an embodiment of the present invention. At 500, a closed caption decoder receives a raw closed captioning stream and decodes it into closed caption text. At 502, a language detection module then detects the language of the closed caption text. This module works in a feedback look with a sentence detection module, which at 504 detects the sentences in the closed caption text. Stop words 506 and character sets 508, both of which are language specific, can be used by the language detection module. Punctuation 510 can also be used by the language detection module as well as the sentence detection module. The result of this is a cleaned up sentence. A POS tagger 512 then tags the resulting sentence using the detected language. The tagged sentence is then fed to a topic extractor 514, which extracts the corresponding topics. The rules that the topic extractor applies are stored in a rule library 516, which is mapped by a genre-rule map 518 based on the genre of the underlying program.

At 520, local validation is performed using a semantic database 522, such as a list of people and locations. If the topic is found to be semantically tagged at 524, then the topic is deemed valid at 526. If not, then remote validation is performed at 528, using an external data source 530 such as an Internet search engine. If the topic is deemed to be remotely validated at 532, then the topic is valid (526), otherwise the topic is invalid at 534.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. An apparatus comprising:
   at least one hardware processor;
   a memory storage device maintaining different extraction rules for different types of program; and
   a plurality of modules executed by the at least one hardware processor, the modules comprising:
   a closed-caption decoder configured to decode a raw closed caption stream for a program and produce closed caption text;
   a language detection module configured to determine a language of the closed caption text;
   a sentence detection module configured to determine one or more sentences in the closed caption text;
   a tagger configured to tag keywords in the closed caption text based on the determined language of the closed caption text and the determined sentences;
   a topic extractor configured to request one or more extraction rules relating to a type of the program from the memory storage device, and extract one or more topics from the closed caption text based on the tagged keywords and the one or more extraction rules relating to the type of the program; and
   a validation module configured to validate the extracted topics by checking each extracted topic against at least one local source and at least one remote source.

2. The apparatus of claim 1, wherein the tagger includes one or more natural language processing functions.

3. The apparatus of claim 1, wherein:
   the type of the program identifies a genre of the program; and
   the one or more extraction rules relate to the genre identified, such that the extracted topics are relevant to the genre identified.

4. The apparatus of claim 3, wherein:
   the memory storage device includes a genre-rule map providing a mapping between the different extraction rules and different genres.

5. The apparatus of claim 1, wherein the one or more extraction rules are stored in a rule library.

6. The apparatus of claim 1, wherein the validation module includes:
   a local validation module for checking each extracted topic against at least one local source; and
   a remote validation module for checking each extracted topic against at least one remote source.

7. The apparatus of claim 6, wherein:
at least one local source comprises a local word list;
at least one remote source comprises an online source connected to the apparatus over a network; and
the remote validation module is configured to submit each extracted topic as a query to online source that includes an Internet search engine.

8. The apparatus of claim 1, wherein the language detection module receives one or more character sets for one or more languages and one or more stop words corresponding to one or more languages as input.

\* \* \* \* \*